(12) United States Patent  (10) Patent No.: US 7,436,668 B2
Bae  (45) Date of Patent: Oct. 14, 2008

(54) PLASMA DISPLAY APPARATUS

(75) Inventor: Sung-Won Bae, Cheonan-si (KR)

(73) Assignee: Samsung SDI Co., Ltd., Suwon (KR)

( * ) Notice: Subject to any disclaimer, the term of this patent is extended or adjusted under 35 U.S.C. 154(b) by 292 days.

(21) Appl. No.: 10/953,340

(22) Filed: Sep. 30, 2004

(65) Prior Publication Data

US 2005/0078446 A1    Apr. 14, 2005

(30) Foreign Application Priority Data

Oct. 9, 2003    (KR) .................. 10-2003-0070279

(51) Int. Cl.
*H05K 7/20*      (2006.01)
*G02F 1/1333*    (2006.01)

(52) U.S. Cl. .................. 361/704; 361/719; 349/58; 349/59

(58) Field of Classification Search .................. None
See application file for complete search history.

(56) References Cited

U.S. PATENT DOCUMENTS

| | | | | |
|---|---|---|---|---|
| 6,067,133 | A * | 5/2000 | Niibori et al. .................. 349/60 |
| 6,373,702 | B2 * | 4/2002 | Oishi et al. .................. 361/704 |
| 6,411,353 | B1 * | 6/2002 | Yarita et al. .................. 349/59 |
| 6,477,039 | B2 * | 11/2002 | Tajima .................. 361/681 |
| 6,522,543 | B2 * | 2/2003 | Kurihara et al. .................. 361/704 |
| 6,538,892 | B2 * | 3/2003 | Smalc .................. 361/710 |
| 6,774,872 | B1 * | 8/2004 | Kawada et al. .................. 345/60 |
| 6,825,894 | B2 * | 11/2004 | Aoyagi et al. .................. 349/61 |
| 6,835,961 | B2 * | 12/2004 | Fukayama .................. 257/84 |
| 6,891,724 | B2 * | 5/2005 | De Lorenzo et al. .................. 361/704 |
| 6,961,102 | B2 * | 11/2005 | Kitada et al. .................. 349/58 |
| 6,989,817 | B2 * | 1/2006 | Tajima .................. 345/156 |
| 7,262,968 | B2 * | 8/2007 | Chang et al. .................. 361/704 |
| 2001/0004546 | A1 * | 6/2001 | Tobita et al. .................. 438/519 |
| 2003/0025428 | A1 * | 2/2003 | Kim et al. .................. 313/46 |
| 2004/0036819 | A1 * | 2/2004 | Ryu et al. .................. 349/58 |
| 2005/0231914 | A1 * | 10/2005 | Mikubo et al. .................. 361/699 |
| 2006/0285294 | A1 * | 12/2006 | Jeong .................. 361/695 |

FOREIGN PATENT DOCUMENTS

| | | | |
|---|---|---|---|
| JP | 10301498 A | * | 11/1998 |
| JP | 11251772 A | * | 9/1999 |
| JP | 2000-268735 | | 9/2000 |
| JP | 2000-338904 | | 12/2000 |
| JP | 2001352022 A | * | 12/2001 |
| JP | 2002124607 A | * | 4/2002 |
| JP | 2004126151 A | * | 4/2004 |

* cited by examiner

*Primary Examiner*—Boris L Chervinsky
(74) *Attorney, Agent, or Firm*—H.C. Park & Associates, PLC (57) ABSTRACT

A plasma display apparatus is provided that enables stable operation of a plasma display panel by accelerating heat dissipation from at least one interior circuit device and preventing degradation of the circuit device. The plasma display apparatus includes a plasma display panel on which an image is displayed, a chassis base facing the plasma display panel, a plurality of circuit devices operating the plasma display panel, a cabinet housing the plasma display panel, the chassis base, and a heat dissipation means interposed between the at least one circuit device and the cabinet to contact the circuit device.

30 Claims, 12 Drawing Sheets

PLASMA DISPLAY APPARATUS

BACKGROUND OF THE INVENTION

This application claims the priority of Korean Patent Application No. 2003-70279 filed on Oct. 9, 2003, in the Korean Intellectual Property Office, the disclosure of which is incorporated herein by reference.

1. Field of the Invention

The present invention relates to a plasma display apparatus, and more particularly, to a plasma display apparatus with a structure that facilitates heat dissipation from a circuit device.

2. Description of the Related Art

A plasma display apparatus is a flat panel display device that displays pictures by using a gas discharge effect. Because of its very good performance and characteristics such as high display capacity, high brightness, high contrast, clear latent image, and large viewing angle, the plasma display apparatus is considered to be a next generation display device to replace the is CRT.

A plasma display apparatus includes a plasma display panel on which an image is displayed, a chassis base facing the plasma display panel, and a circuit section for driving the panel which is located on the back of the chassis base. A cabinet of the plasma display apparatus houses the plasma display panel and the chassis base.

The plasma display panel includes a first and a second substrate, separated by a gap and facing each other to form a discharge space. A plurality of pairs of discharge sustain electrodes is formed on the first substrate, a plurality of address electrodes is formed on the second substrate, and barrier ribs that are interposed between the substrates separate the discharge space into a plurality of discharge cells.

Such a plasma display apparatus can display an image by selectively discharging various discharge cells, thereby enabling a color display. For this purpose, a driving device connected to the address electrodes provides sequentially controlled signals to the address electrodes.

However, the driving device generates much heat. Therefore, if the heat generated by the driving device is not properly dissipated, proper operation of the plasma display apparatus cannot be achieved.

As the size of the discharge cells decreases, the driving device becomes denser. Therefore, better heat dissipation from the circuit device is required.

According to a technique for improving the heat dissipation of the driving device disclosed in Japanese Patent Laid-Open publication 2000-268735, a conductive pattern is formed on a glass substrate and the driving device is mounted on the conductive pattern, and the is conductive pattern and a chassis base are connected by a metal clip. According to the disclosed technique, heat generated by the driving device is transferred to the chassis base via the conductive pattern.

Generally, the chassis base performs as a heat sink that dissipates heat from the plasma display panel and the circuit section, and thus the heat gathers in the chassis base. The heat gathered in the chassis base is transferred to inside air by convection in a closed space. However, due to a low heat transfer rate, much heat accumulates in the chassis base, which is maintained at a high temperature.

Therefore, according to the conventional art, because the heat generated by the driving device is not effectively dissipated, a malfunction may occur due to a degradation of a device or, in a severe case, the normal operation of the plasma display apparatus may be disturbed by thermal destruction caused by thermal stress.

Also, when the heat generated by the driving device is transferred to the chassis base, there are some harmful effects to the plasma display panel and other circuit sections, the heat of which is dissipated through the chassis base.

SUMMARY OF THE INVENTION

To solve the above and/or other problems, the present invention provides an improved plasma display apparatus that accelerates heat dissipation from one or more circuit devices.

The present invention also provides a plasma display apparatus that can protect a plasma display panel and the circuit devices more effectively.

According to an embodiment of the present invention, there is provided a plasma display apparatus that includes a plasma display panel on which an image is displayed. A chassis base supports the plasma display panel, and a plurality of circuit devices operates the plasma display panel. A cabinet houses the plasma display panel, the chassis base, and the plurality of circuit devices; and a heat dissipation means is interposed between at least one circuit device and the cabinet to contact the circuit device The heat dissipation means may include at least two different heat transfer media that are stacked. One of the heat transfer media may be a metal plate selected from the group consisting of aluminum plate, copper plate, silver plate, and nickel plate. One of the heat transfer media can be deformed easily by an external force. One of the heat transfer media may be a thermal conductive container filled with a liquid heat dissipation material. The liquid heat dissipation material may be a thermal grease.

One of the heat transfer media is a thermal conductive container filled with a thermal conductive powder. The thermal conductive powder may be a powder selected from the group consisting of an aluminum powder, a graphite powder, a copper powder, a silver powder, and a nickel powder.

One of the heat transfer media may be a matrix resin containing a heat transfer filler. The heat transfer filler is a metal powder selected from the group consisting of an aluminum powder, a graphite powder, a copper powder, a silver powder, and a nickel powder. One of the heat transfer media is a carbon fiber fabric.

The heat dissipation means may be a heat pipe, or may include cooling fins.

According to another embodiment of the present invention, there is provided a plasma display apparatus that includes a plasma display panel on which an image is displayed. A chassis base supports the plasma display panel. A plurality of circuit devices operates the plasma display panel. A heat dissipation means contacts at least one circuit device. A cabinet houses the plasma display panel, the chassis base, the plurality of circuit devices. Additionally, the heat dissipation means, includes at least a protrusion hole through which at least a portion of the heat dissipation means protrudes to the outside of the plasma display apparatus.

The heat dissipation means may include at least two different heat transfer media that are stacked. One of the heat transfer media may be a metal plate selected from the group consisting of aluminum plate, copper plate, silver plate, and nickel plate. One of the heat transfer media can be deformed easily by an external force.

One of the heat transfer media may be a thermal conductive container filled with a liquid heat dissipation material. The liquid heat dissipation material may be a thermal grease.

One of the heat transfer media is a thermal conductive container filled with a thermal conductive powder. The thermal conductive powder is a powder selected from the group consisting of an aluminum powder, a graphite powder, a copper powder, a silver powder, and a nickel powder.

One of the heat transfer media is a matrix resin containing a heat transfer filler. The heat transfer filler is a metal powder selected from the group consisting of an aluminum powder, a graphite powder, a copper powder, a silver powder, and a nickel powder.

One of the heat transfer media may be a carbon fiber fabric.

The heat dissipation means may be a heat pipe, or may include cooling fins.

BRIEF DESCRIPTION OF THE DRAWINGS

The above and other features and advantages of the present invention will become more apparent by describing in detail preferred embodiments thereof with reference to is the attached drawings.

DETAILED DESCRIPTION OF THE INVENTION

The present invention will now be described more fully with reference to the accompanying drawings in which exemplary embodiments of the invention are shown. Throughout the drawings, like reference numerals refer to like elements.

Figure 1:
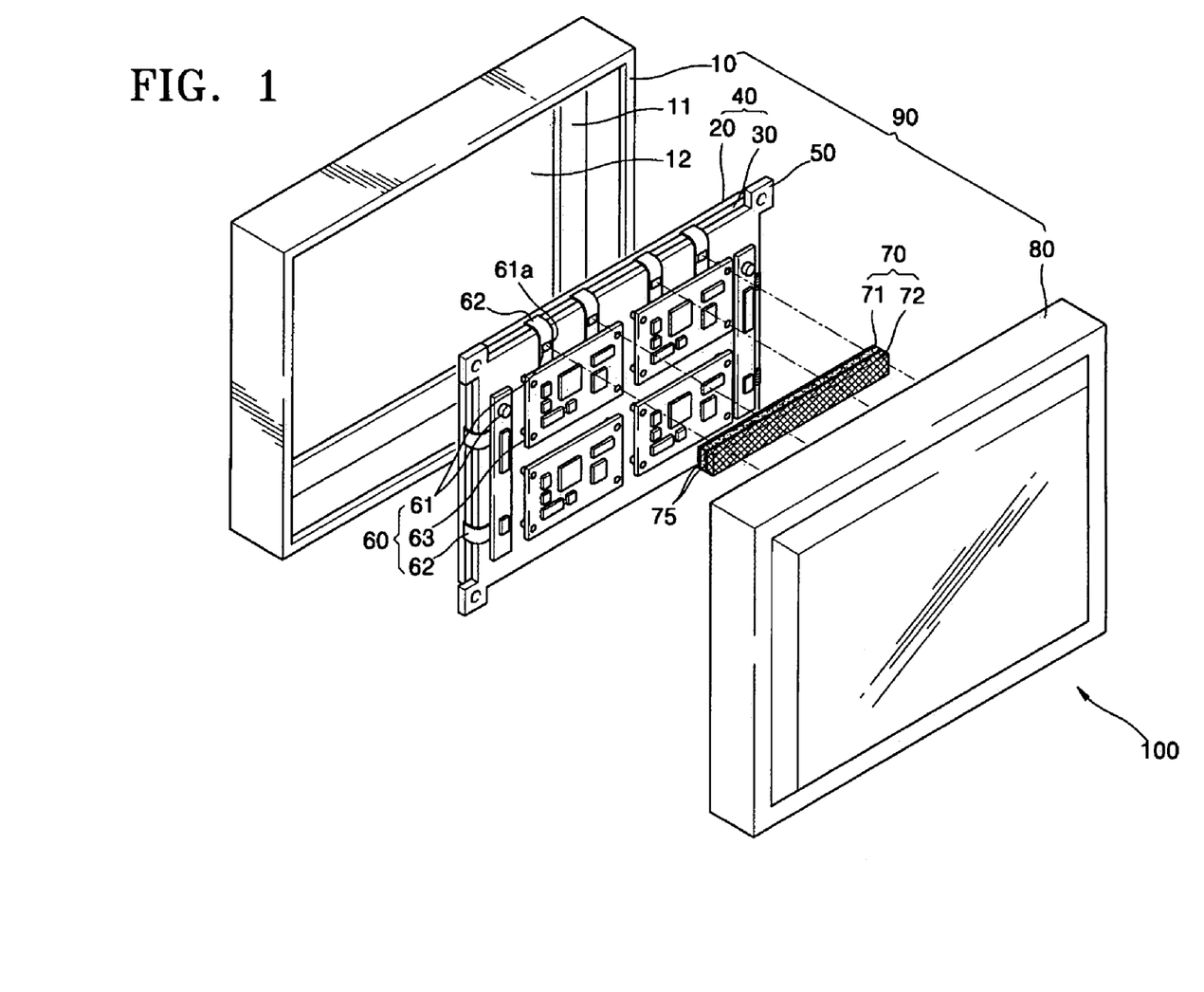
FIG. 1 is an exploded perspective view of a plasma display apparatus, according to a first embodiment of the present invention.
Figure 2:
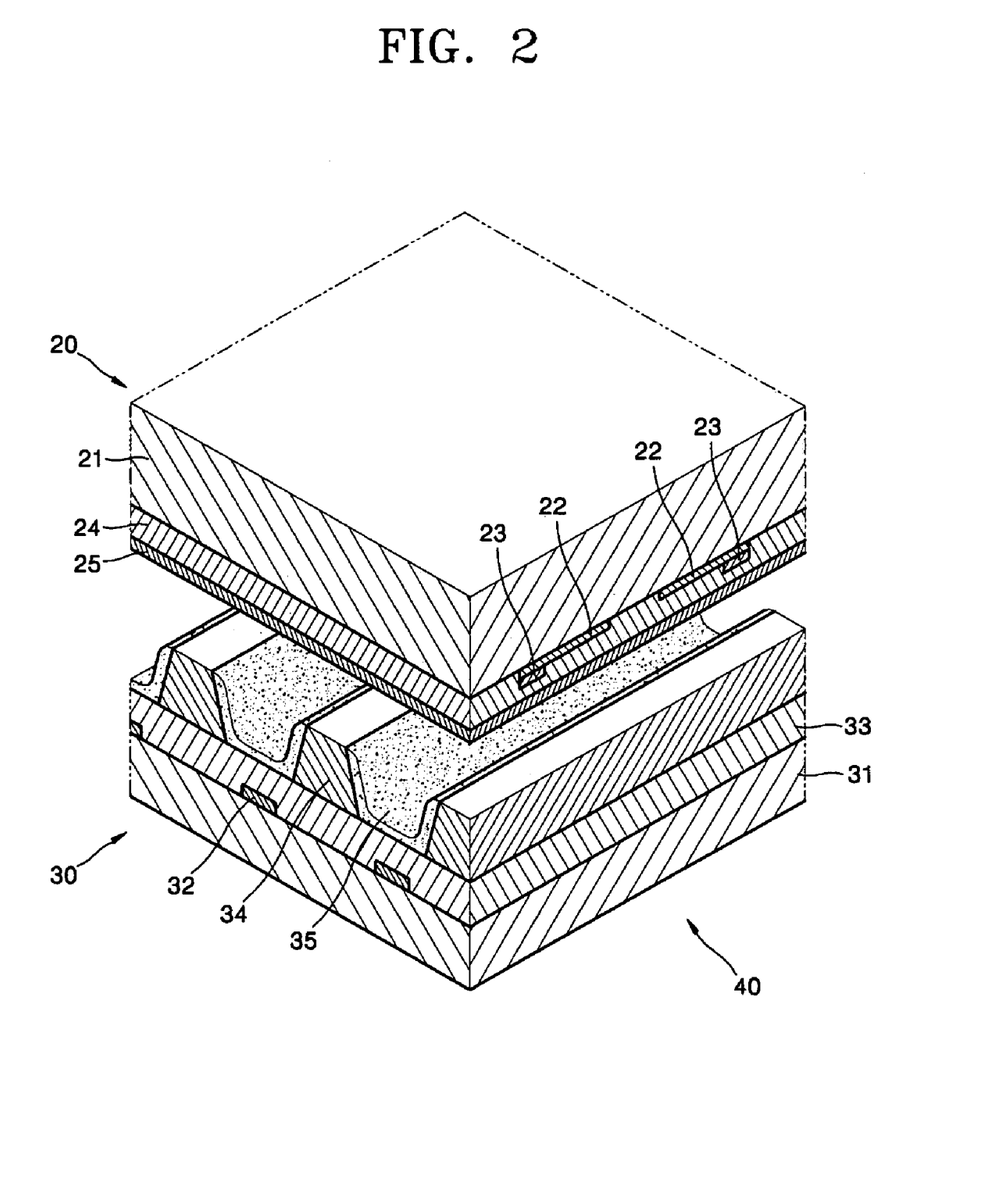
FIG. 2 is a partial perspective view of the plasma display apparatus of FIG. 1.
Figure 3:
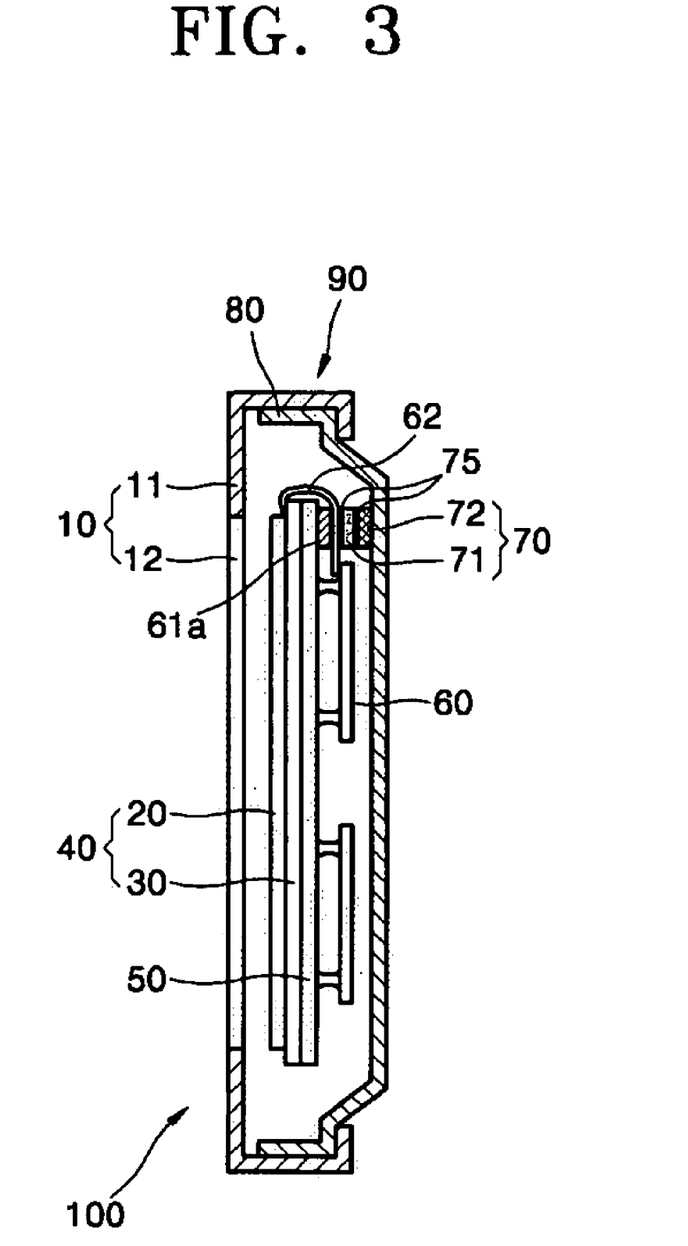
FIG. 3 is a cross-sectional view of the plasma display apparatus of FIG. 1.

FIG. 1 is an exploded perspective view of a plasma display apparatus according to a first embodiment of the present invention. FIG. 2 is a partial perspective view of the plasma display apparatus of FIG. 1, and FIG. 3 is a cross-sectional view of the plasma display apparatus of FIG. 1.

Referring to FIG. 1, a plasma display apparatus includes a PDP 40, a chassis base 50, a circuit section 60, and a cabinet 90. Referring to FIG. 2, the PDP 40 includes a first panel 20 and a second panel 30 combined together.

The first panel 20 on which an image will be displayed includes a first substrate 21, discharge sustain electrodes 22, bus electrodes 23, a first dielectric layer 24, and a protective layer 25.

The discharge sustain electrodes 22 are arranged in a predetermined pattern, such as a stripe pattern under the first substrate 21.

The discharge sustain electrode 22 may be composed of a transparent material such as indium tin oxide (ITO) for transmitting discharged visible light from a fluorescent layer 35. Because the discharge sustain electrode 22 composed of ITO has low electric conductivity, overall impedance is reduced by including the bus electrode 23.

The bus electrode 23 is combined with the discharge sustain electrode 22, and may be arranged in a predetermined pattern such as a stripe pattern. The bus electrode 23 may include a single metal layer composed of a metal having high electric conductivity such as aluminum, copper or silver, or a stacked metal layer such as a triple-layer of chrome-copper-chrome.

As shown in FIG. 2, a first dielectric layer 24 is disposed under the first substrate 21 to cover the discharge sustain electrodes 22 and the bus electrodes 23. A protective layer 25, disposed under the first dielectric layer 24 protects the first dielectric layer 24 from ions or electrons when discharge occurs.

The second panel 30 includes a second substrate 31, address electrodes 32, a second dielectric layer 33, barrier ribs 34, and fluorescent layers 35.

The second substrate 31 may also be composed of glass like the first substrate 21. The address electrodes 32 are arranged in a predetermined pattern, such as a stripe pattern, on the second substrate 31. The address electrodes 32 are arranged approximately orthogonal to the discharge sustain electrodes 22.

The second dielectric layer 33 is formed on the second substrate 31 to cover the address electrodes 32. Barrier ribs 34 are formed on the second dielectric layer 33 parallel to the address electrodes 32.

The fluorescent layers 35 may be formed on the second dielectric layer 33 and the barrier ribs 34. They include a red fluorescent layer, a green fluorescent layer, and a blue fluorescent layer.

91 The first panel 20 and the second panel 30 may be combined using frit glass, and each of the cells is filled with a discharge gas.

Driving devices 61a (FIG. 1) are connected to terminals of the address electrodes 32 to sequentially apply scan signals to the address electrodes 32. By applying a controlled signal to each of the address electrodes 32, a selective discharge can be performed in each discharge cell, thereby enabling the display of a variety of colors with a range of gray scales.

Referring to FIG. 1, the chassis base 50 accelerates the dissipation of heat from the PDP 40 and the circuit section 60, and is composed of a material having high thermal conductivity such as aluminum. The chassis base 50 can be manufactured by die casting or press processing.

The circuit section 60 for driving the PDP 40 is disposed on a back surface of the chassis base 50. The circuit section 60 includes circuit devices 61 such as driving devices 61a that apply control signals to the PDP 40, a circuit substrate 63 on which a plurality of circuit devices 61 are mounted, and cable 62. A flexible printed circuit (FPC) may be used for the cable 62 and the driving devices 61a can be mounted on a film of the FPC (Chip On Film, COF).

As shown in FIG. 1, cabinet 90 houses the PDP 40 and the chassis base 50 on which the circuit section 60 are mounted, and the cabinet 90 includes a front cover 10 and a back cover 80. The front cover 10 and the back cover 80 constitute an external appearance of the plasma display apparatus 100, and protect parts therebetween.

The front cover 10 includes a rim 11 and a filter 12. The filter 12 can include tempered glass (not shown) fixed on the rim 11 and an electromagnetic interference (EMI) shielding layer (not shown). The rim 11 of the front cover 10 and the back cover 80 may be composed of a thermal conductive material.

A heat dissipation means 70 is interposed between the driving devices 61a and the cabinet 90. The heat dissipation means 70 as depicted in FIGS. 1 and 3 includes a first heat transfer medium 71 and a second heat transfer medium 72. The first heat transfer medium 71 contacts the driving devices 61a and the second heat transfer medium 72 contacts the back cover 80.

Also, as depicted in FIG. 3, the heat dissipation means 70 may be attached to the driving device 61a by a thermal conductive adhesive 75. Additionally, the first heat transfer medium 71 and the second heat transfer medium 72 may be combined by a thermal conductive adhesive 75.

In one embodiment, the first heat transfer medium 71 is formed to have a thermal conductivity over 0.1 W/mk and high flexibility. The first heat transfer medium 71 may have a variety of shapes such as a matrix resin containing a heat transfer filler. The matrix resin may be an epoxy resin, and the heat transfer filler may be a powder that has high thermal conductivity such as aluminum powder, graphite powder, or copper powder.

Also, the first heat transfer medium 71 may be formed by sealing a liquid heat dissipation material such as a heat radiation grease in a thermal conductive container. The thermal conductive container may be formed of an aluminum foil. In the first heat transfer medium 71 a high thermal conductive powder properly agglomerated may replace a liquid heat dissipation material in the thermal conductive container.

A carbon fiber texture or a stack of carbon fibers may be used as the first heat transfer medium 71 since carbon fiber has high thermal conductivity and flexibility.

In one embodiment the flexibility of the first heat transfer medium 71 protects the driving device 61a by absorbing and mitigating a compression force that can be generated while assembling the front cover 10 and the back cover 80.

The second heat transfer medium 72 may be a plate composed of a high thermal conductivity material such as aluminum, copper, silver, or nickel. By interposing the second heat transfer medium 72 with high thermal conductivity, the heat generated by the driving device 61a can be effectively transferred to the back cover 80, and distributed in a plane of the second heat transfer medium 72, thereby improving heat dissipation efficiency of the driving device 61a.

In use, heat generated by the driving devices 61a is transferred to the back cover 80 via the first and the second heat transfer mediums 71 and 72, and then dissipated into the air by convection from the back cover 80.

Figure 4A:
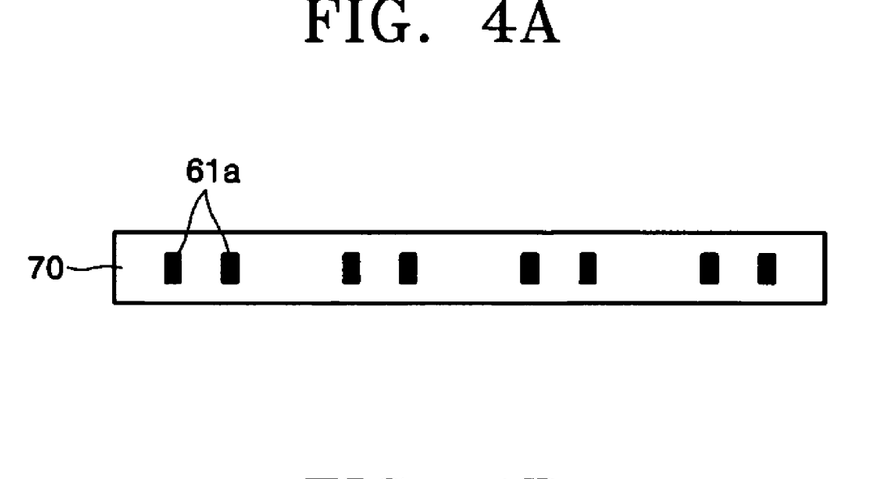
FIGS. 4A, 4B, and 4C are schematic drawings of structure of the heat dissipation means which can be applied to the present invention.
Figure 4B:
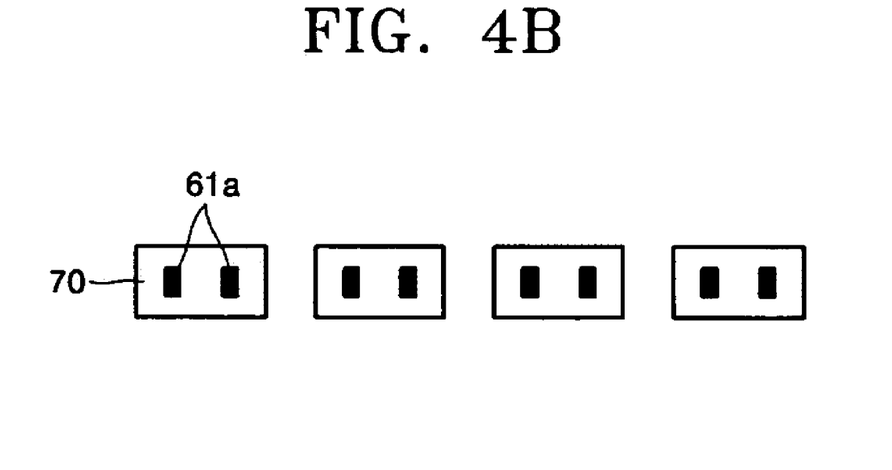
Figure 4C:
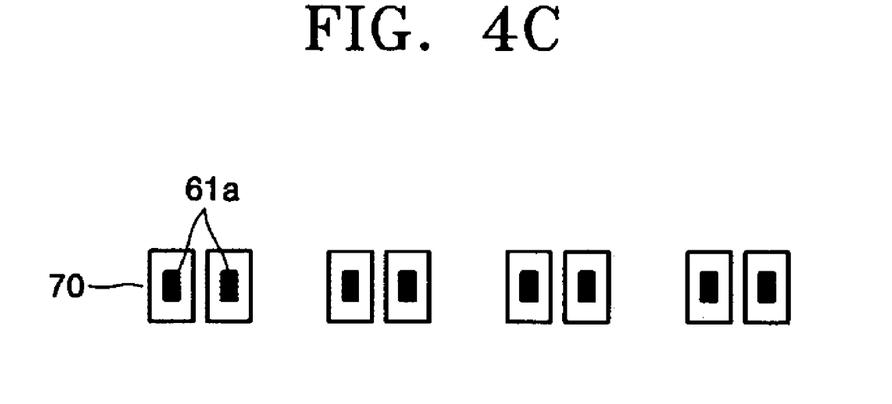

The driving devices 61a extend horizontally and a structure of the heat dissipation means 70 of the driving devices 61a can be formed to a variety of shapes as depicted in FIGS. 4A, 4B and 4C.

That is, the heat dissipation means 70 may be formed in a single body type, as depicted in FIG. 4A, in a group type, as depicted in FIG. 4B, or in an individual type, as depicted in FIG. 4C. In a single body type, a heat dissipation means 70 dissipates the heat generated by all of the driving devices 61a. In a group type, a heat dissipation means 70 dissipates heat from a group of the driving devices 61a. In an individual type, a heat dissipation means 70 dissipates heat from each individual driving device 61a.

The single body type may rapidly diffuse the heat generated by the driving devices 61a to a wide area since it is formed as a single body. The individual type improves workability when maintenance work is performed since the heat dissipation means can be individually attached and detached, thereby reducing maintenance costs. The group type has both of the advantages of the single body type and the individual type.

Figure 5:
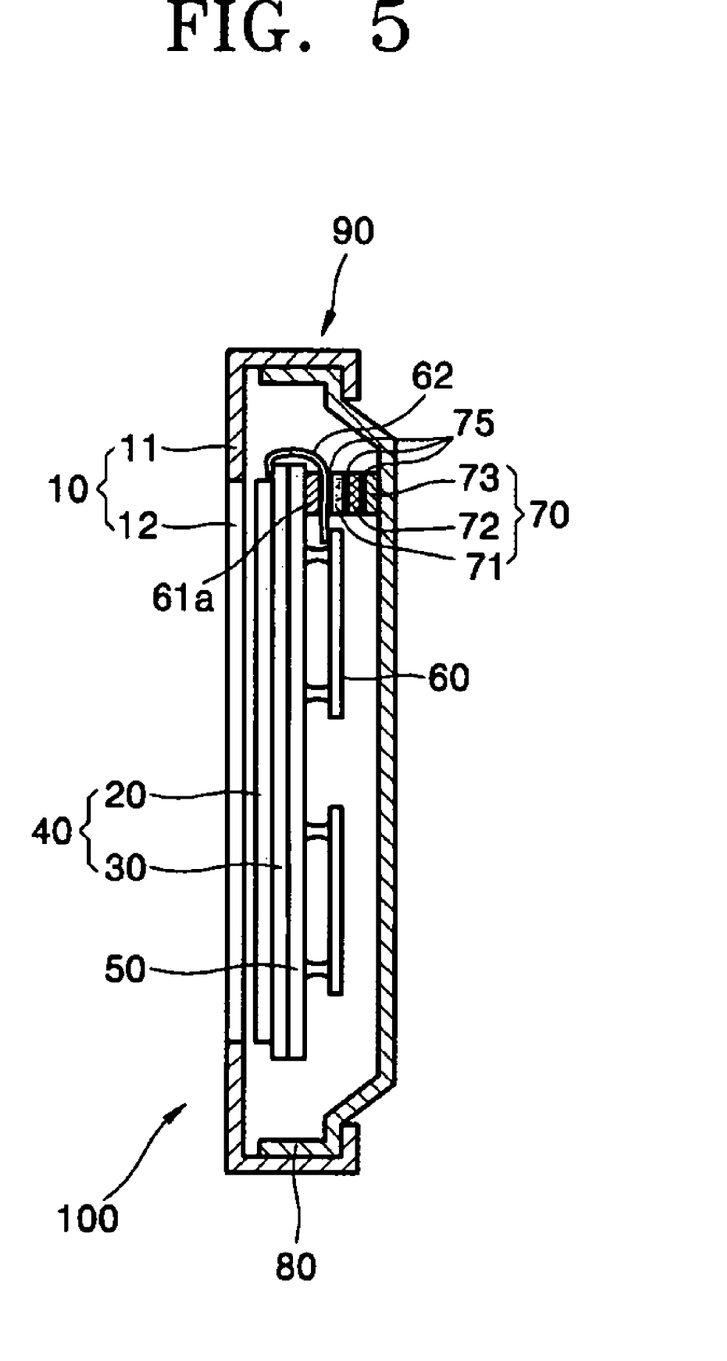
FIG. 5 is a cross-sectional view of a plasma display apparatus, according to a second embodiment of the present invention.

FIG. 5 is a cross-sectional view of a plasma display apparatus according to second embodiment of the present invention. Referring to FIG. 5, a heat dissipation means 70 includes a first heat transfer medium 71, a second heat transfer medium 72, and a third heat transfer medium 73, and is interposed between driving devices 61a and back cover 80. The first and the third heat transfer mediums 71 and 73 are formed to have high flexibility and thermal conductivity, and the second heat transfer medium 72 is formed to have high thermal conductivity.

The first and the third heat transfer mediums 71 and 73 can be formed in a variety of types. That is, a matrix resin that contains a heat transfer filler, a thermal conductive container in which a liquid heat dissipation material or a thermal conductive powder is filled, or a stacked layer of carbon fibers.

The second heat transfer medium 72 can be a plate formed of aluminum, silver, copper, or nickel.

81 By disposing the first and the third heat transfer mediums 71 and 73, which have flexibility, on both sides of the second heat transfer medium 72, which has high thermal conductivity, the driving devices 61a are protected more effectively than in the conventional manner. Also, because of the added flexibility, and a tolerance margin of the parts constituting the plasma display apparatus 100 can be increased.

Figure 6:
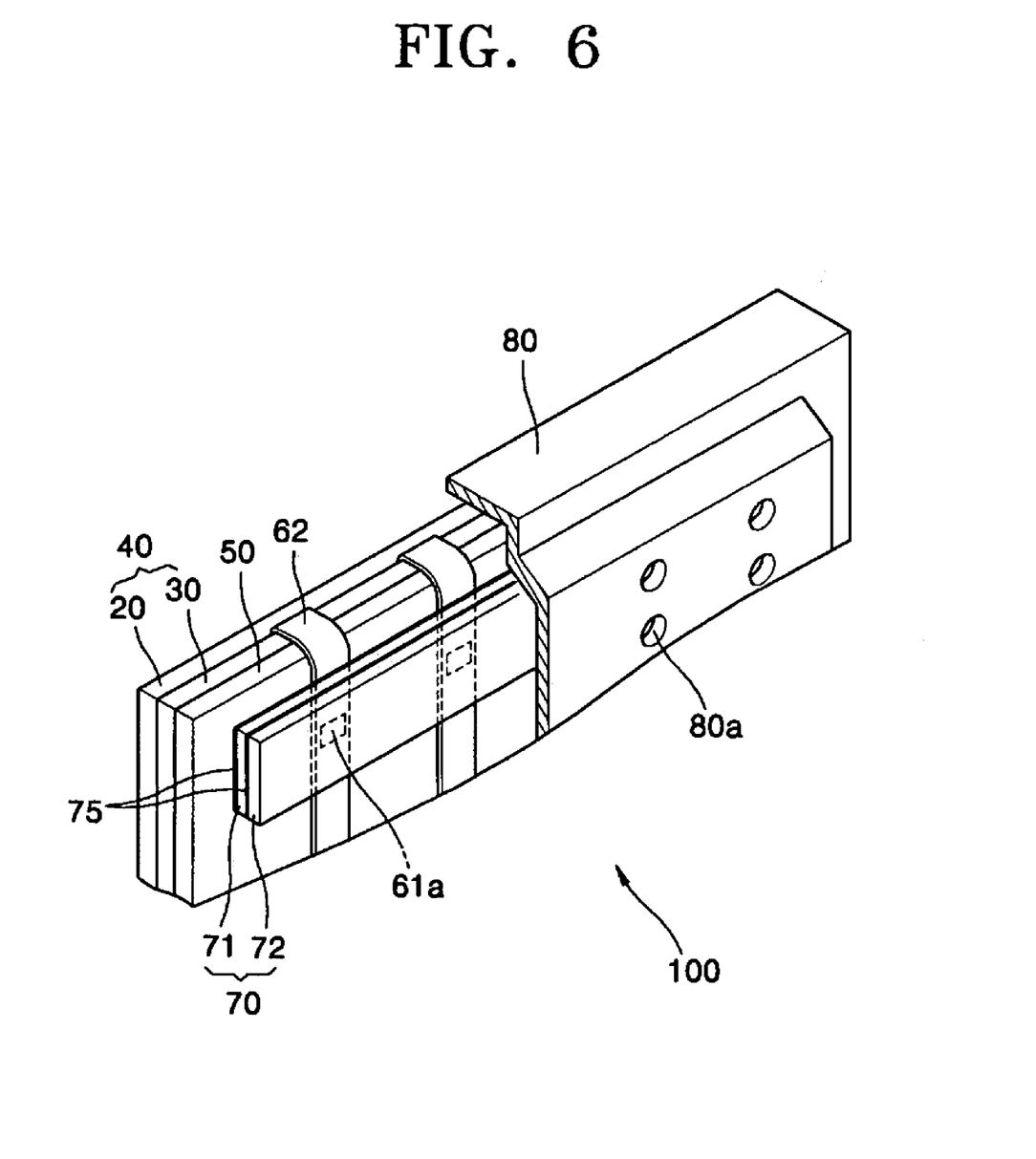
FIG. 6 is a partial sectional view of a plasma display apparatus, according to a third embodiment of the present invention.

FIG. 6 is a partial sectioned view of a plasma display apparatus according to a third embodiment of the present invention. Referring to FIG. 6, a heat dissipation means 70 of the driving device 61a includes first and second heat transfer mediums 71 and 72. The first heat transfer medium 71 has high flexibility and thermal conductivity and contacts the driving device 61a, and the second heat transfer medium 72 has high thermal conductivity and is interposed between the back cover 80 and the first heat transfer medium 71. The heat dissipation means 70 may be attached to the chassis base 50 by a thermal conductive adhesive 75.

As shown in FIG. 6, air holes 80a for improved air flow are formed on the back cover 80. When low temperature air from the outside enters the plasma display apparatus 100 through the air holes 80a, the temperature of the heat dissipation means 70 and the temperature of the chassis base 50 are reduced. Therefore, heat generated by the driving device 61a can be rapidly transferred to the heat dissipation means 70 and the chassis base 50. Particularly, since the second heat transfer medium 72 contacts the back cover 80 in which the air holes 80a are formed, the second heat transfer medium 72 may be air-cooled by direct contact with the outside air.

Figure 7:
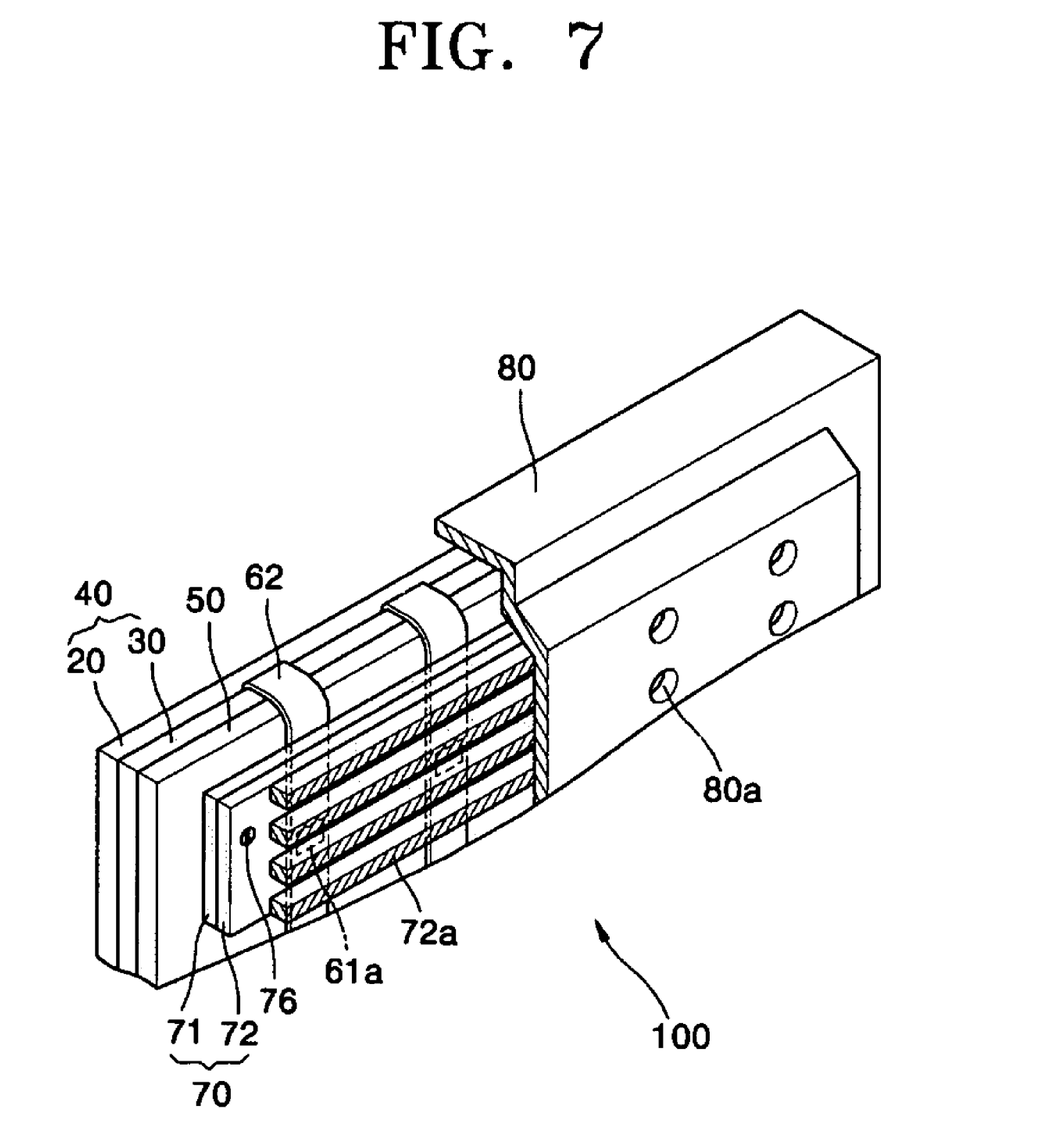
FIGS. 7 and 8 are partial sectional views of a plasma display apparatus, according to modified embodiments of the third embodiment.

As depicted in FIG. 7, a plurality of cooling fins 72a may be included on the back surface of the second heat transfer medium 72 to increase heat transfer efficiency. If the cooling fins 72a are formed, the heat dissipation of the driving device 61a is improved by increasing a surface area in contact with the air entering through the air holes 80a and the second heat transfer medium 72.

The heat dissipation means 70 may be attached to the chassis base 50 by a combining means 76.

When there are a sufficient number of the air holes 80a, the heat generated by the driving device 61a may be sufficiently removed by the air entering through the air holes 80a. In this case, the second heat transfer medium 72 and the back cover 80 may be mounted with a space interposed therebetween.

Figure 8:
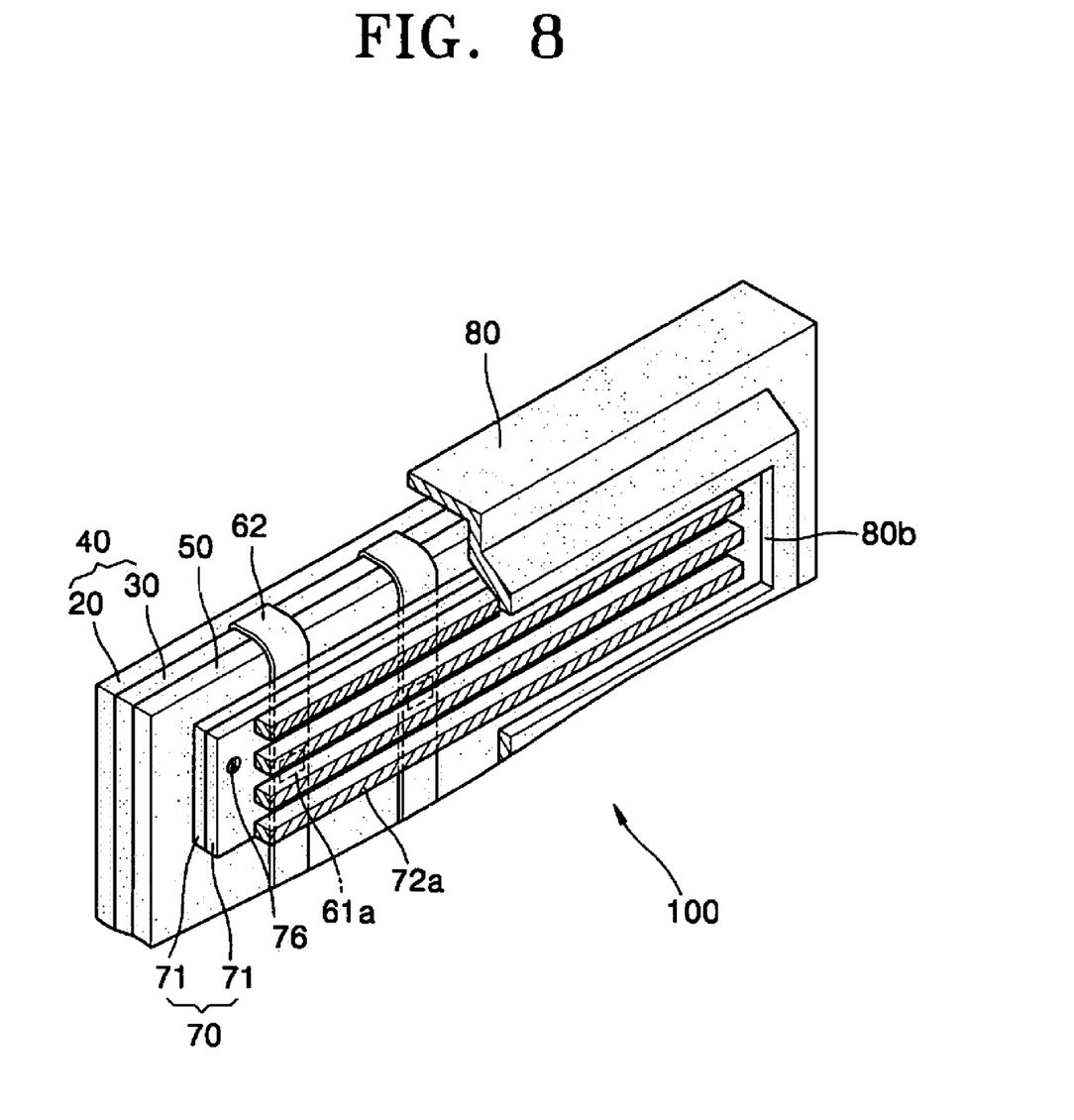

Referring to FIG. 8, a heat dissipation means 70 of the driving device 61a includes a first and a second heat transfer mediums 71 and 72. The first heat transfer medium 71 contacts the driving device 61a. A plurality of heat cooling fins 72a are formed on a back surface of the second heat transfer medium 72, which contacts the first heat transfer medium 71.

In this embodiment, protrusion hole 80b is formed in the back cover 80, and the heat cooling fins 72a formed on the second heat transfer medium 72 protrude from the plasma display apparatus 100 through the protrusion hole 80b. The heat dissipation means 70 may be fixed on a back side of the chassis base 50 by a combining means 76.

Since the cooling fins 72a formed on the second heat transfer medium 72 protrude outside of the plasma display apparatus 100 through the protrusion hole 80b, the heat generated by the driving device 61a may be directly transferred outside by convection, thereby promoting dissipation of heat from the driving device 61a.

Also, relatively low temperature outside air can enter the plasma display apparatus 100 through the protrusion hole 80b, and may reduce the temperature of the chassis base 50. In this manner, the heat generated by the driving device 61a may be effectively dissipated via the chassis base 50.

Figure 9:
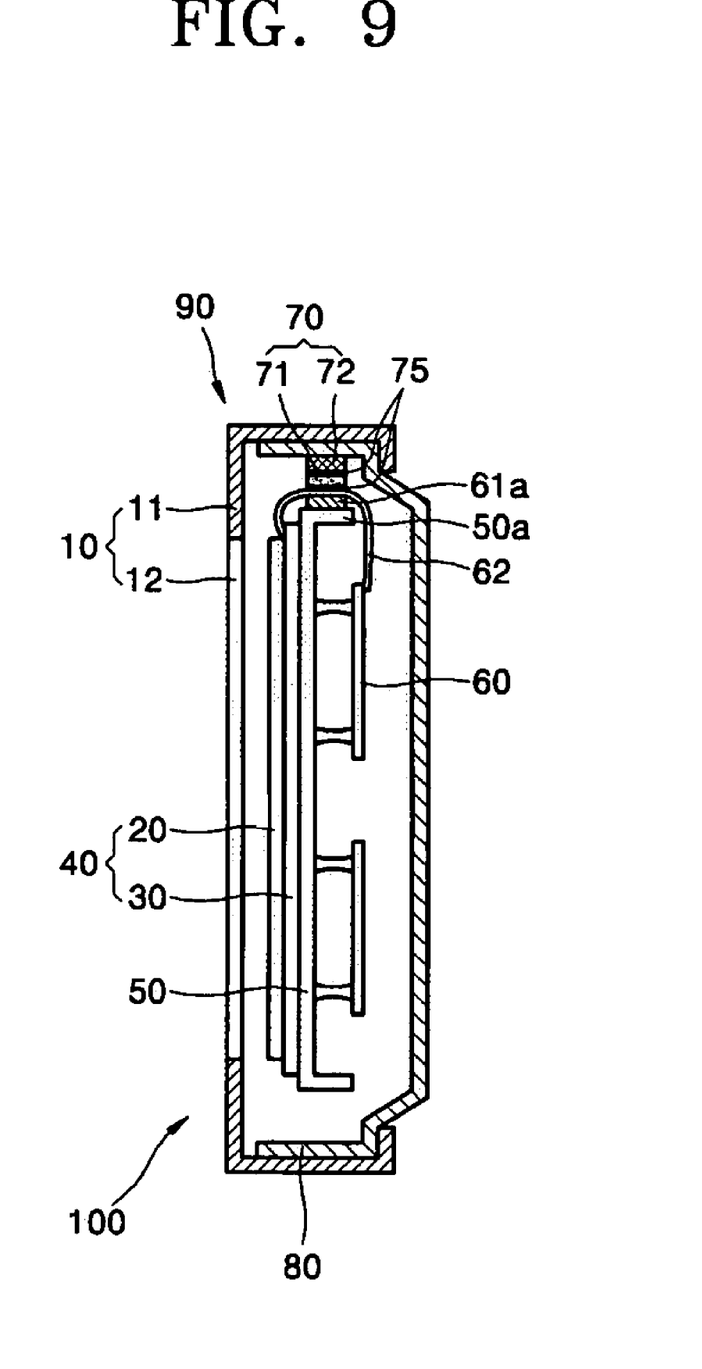
FIG. 9 is a cross-sectional view of a plasma display apparatus, according to a fourth embodiment of the present invention.

FIG. 9 is a cross-sectional view of a plasma display apparatus 100 according to a fourth embodiment of the present invention. Referring to FIG. 9, the chassis base 50 has bent parts 50a, and the driving device 61a is installed on the bent part 50a. Also, a heat dissipation means 70 is interposed between the driving device 61a and an upper surface of the back cover 80. The heat dissipation means 70 includes first and second heat transfer mediums 71 and 72.

The first heat transfer medium 71 has high thermal conductivity and flexibility and contacts the driving device 61a. The second heat transfer medium 72 also has high thermal conductivity and contacts an upper surface of the back cover 80. The front cover 10 and the back cover 80 contact each other, and a rim part 11 of the front cover 10 and the back cover 80 may be composed of a high thermal conductive material such as aluminum.

In use, heat generated by the driving device 61a is transferred to the back cover 80 by the first and second heat transfer mediums 71 and 72, and dissipated outside through the front cover 10 and the back cover 80 by convection.

By mounting the driving device 61a on the bent part 50a of the chassis base 50, the utilization of back surface of the chassis base 50 on which various circuit devices are mounted can be improved. Also, since the heat dissipation means 70 is connected to both the front cover 10 and the back cover 80, thermal capacity may be increased, and both the front cover 10 and the back cover 80 may be used for heat cooling, thereby improving heat dissipation of the driving device 61a.

Figure 10:
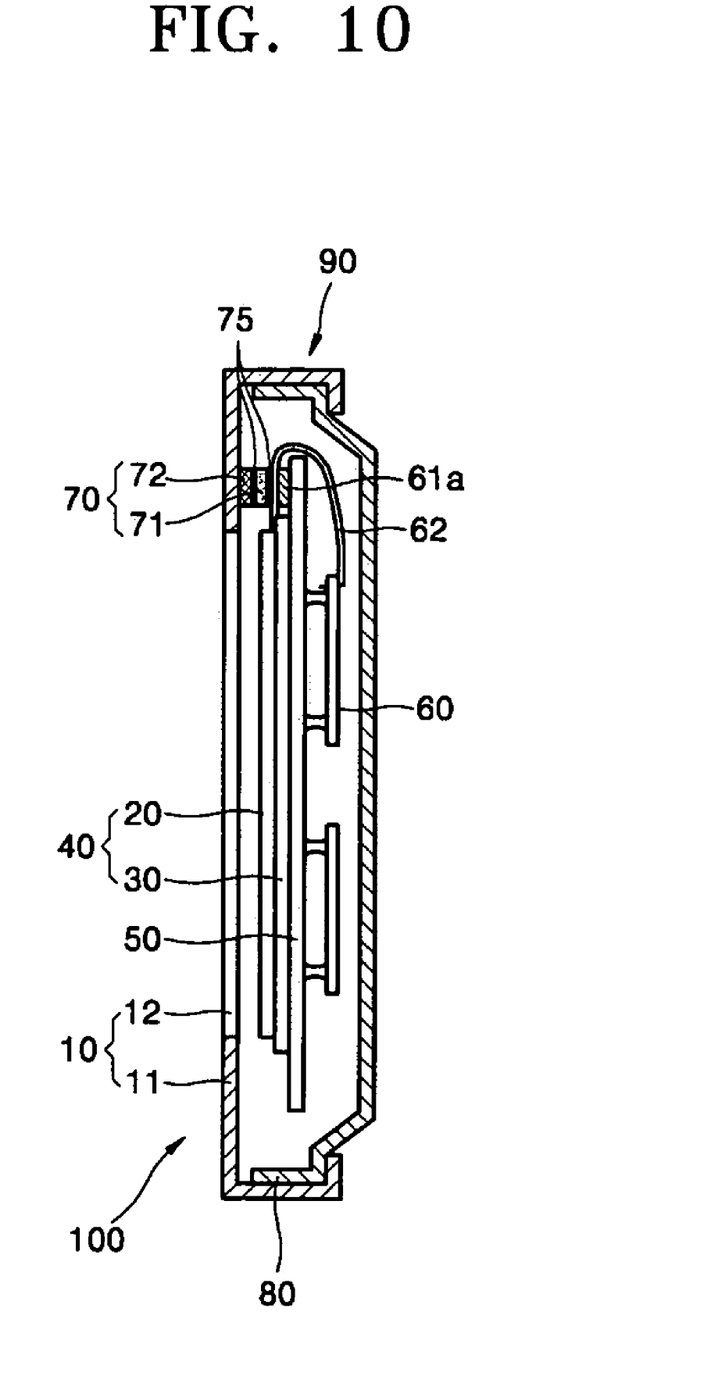
FIG. 10 is cross-sectional view of a plasma display apparatus, according to a fifth embodiment of the present invention.

FIG. 10 is a cross-sectional view of a plasma display apparatus 100 according to a fifth embodiment of the present invention. Referring to FIG. 10, the chassis base 50 in this embodiment is wider than the plasma display panel 40, and the driving device 61a is mounted on the edge of the chassis base 50. A heat dissipation means 70 of the driving device 61a includes first and second heat transfer mediums 71 and 72, and a rim part of the front cover 10 can be formed of a high thermally conductive material such as but not limited to aluminum.

The heat generated by the driving device 61a is conducted to the front cover 10 through the first and second heat transfer mediums 71 and 72, and then dissipated outside of the plasma display apparatus 100 by convection.

The front cover 10 can provide a heat cooling surface and therefore, heat dissipation through the chassis base 50 and the back cover 80 of the various circuit devices 61 may be improved.

Also, the utilization of the back surface of the chassis base 50 on which various circuit devices are mounted may be improved by mounting the driving device 61a on a front surface of the chassis base 50 as shown in FIG. 10.

Figure 11:
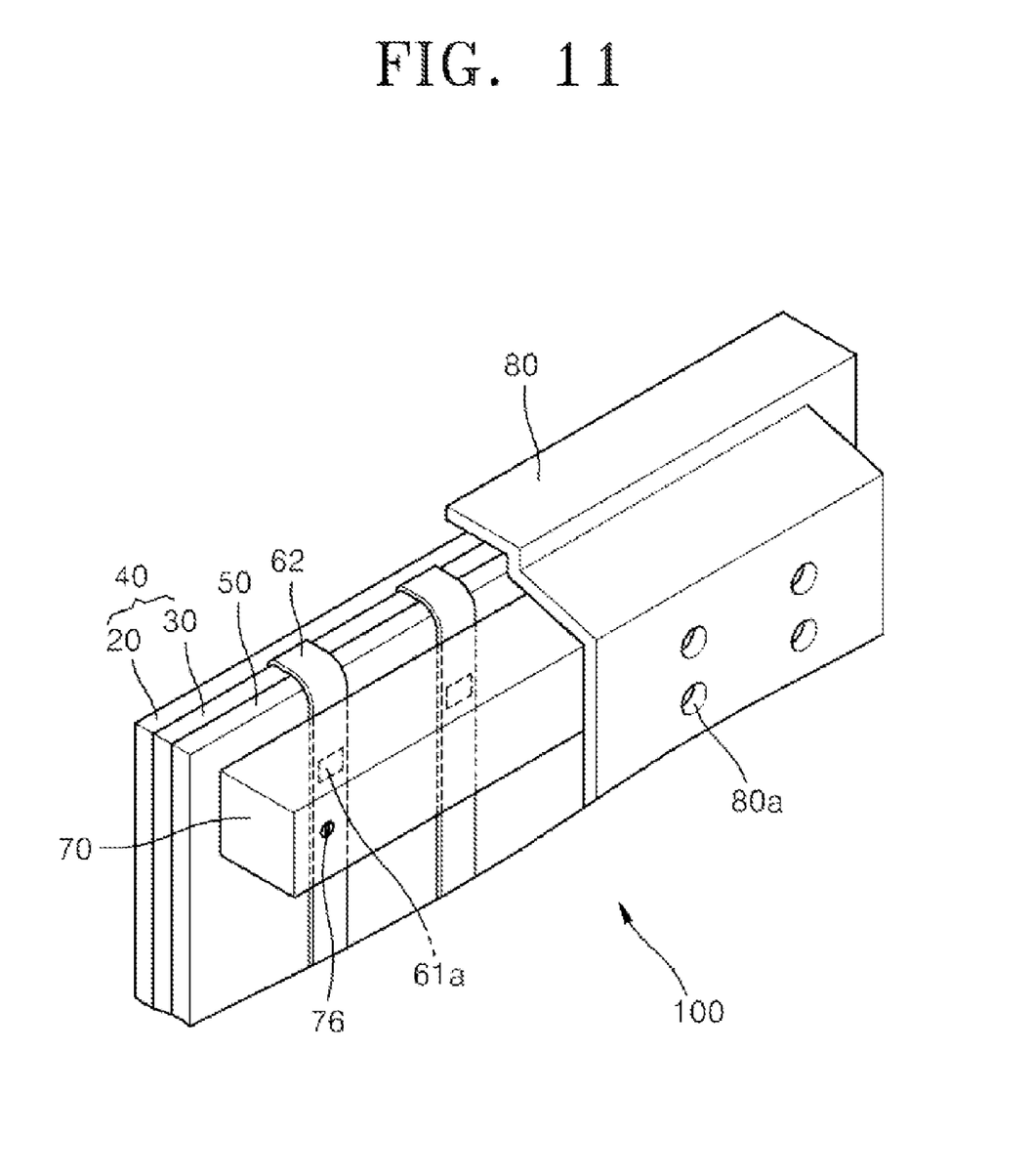
FIG. 11 and FIG. 12 are partial section views of a plasma display apparatus according to a sixth embodiment of the present invention.
Figure 12:
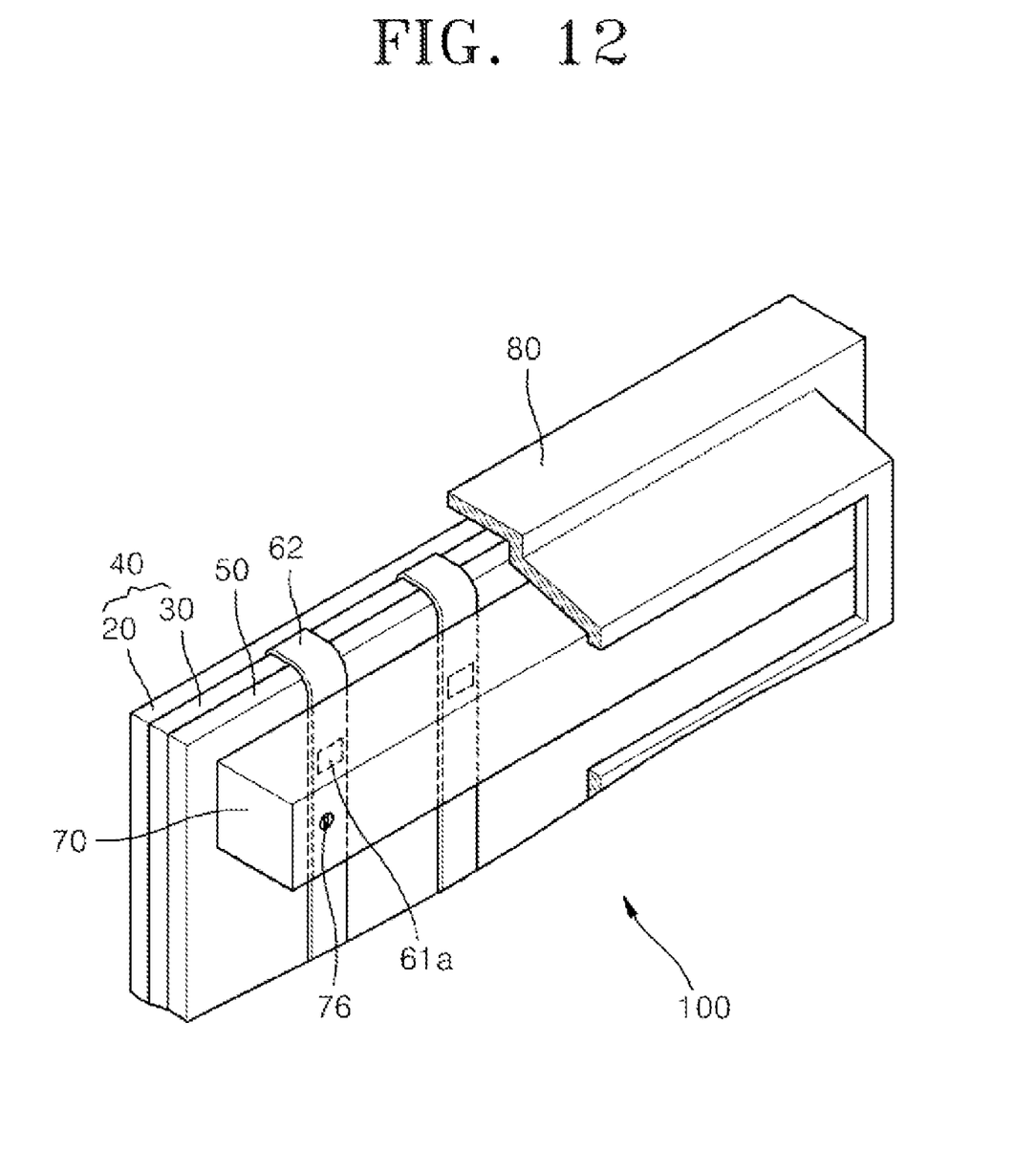

As shown in FIG. 11 and FIG. 12, a heat pipe may be used as a heat dissipation means 70 of the driving device. The heat pipe, which is widely used for cooling a high density electronic circuit or an electronic chip, is a heat transfer apparatus through which a coolant flows such that the coolant evaporates in a heat absorption section and condenses at a heat dissipation section.

When the heat pipe is used as the heat dissipation means of the driving device, the heat absorption section contacts the driving device and the heat dissipation section contacts the back cover. The driving device can further be cooled by low temperature outside air if the heat dissipation section of the heat pipe is exposed to the outside through hole formed in the cabinet.

In the drawings of embodiments of the present invention, the driving device is depicted as example of heat source for convenience of explanation; however, it will be understood by those skilled in the art that the present invention is not limited to the driving device but can be applied to various circuit devices such as a field effect transistor (FET).

According to an embodiment of the present invention, heat generated by a driving device is conducted to a cabinet by a heat dissipation means interposed between a circuit device and the cabinet, and then is dissipated outside by convection at a surface of the cabinet.

By using a cabinet having a wide surface for heat transfer, high heat transfer efficiency and thermal capacity can be achieved. Also, by reducing the amount of heat transferred to the chassis base from the driving device, the plasma display panel and other circuit sections, the heat of which is dissipated through the chassis base, can be effectively protected.

Also, since the cabinet is in contact with the outside air which has a relatively low temperature, the efficiency of heat transfer through the cabinet is better than in the case when heat generated by the circuit device is transferred to a relatively high temperature inside air by a heat sink on a back surface of the circuit device.

Therefore, according to embodiments of the present invention, overheating and degradation of the circuit device can be prevented, thereby enabling stable operation of the plasma display apparatus. Accordingly, a plasma display apparatus with a high resolution can be provided since heat generated by the circuit device is effectively exhausted and the plurality of circuit devices can be mounted in a dense arrangement.

According to embodiments of the present invention, since the heat dissipation means in contact with the circuit device protrudes outside of the plasma display apparatus through a protrusion hole formed in the cabinet, heat generated by the driving device can be directly dissipated into the air by convection. Thus, heat transfer efficiency of the driving device is improved, and the plasma display panel and other driving devices are also effectively cooled by the low temperature air entering through the protrusion hole.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A plasma display apparatus, comprising:
   a plasma display panel on which an image is displayed;
   a chassis base supporting the plasma display panel;
   a plurality of circuit devices to operate the plasma display panel;
   a cabinet housing the plasma display panel, the chassis base, and the plurality of circuit devices; and
   a heat dissipation means interposed between at least one circuit device and the cabinet, the heat dissipation means comprising heat transfer media contacting the circuit device and the cabinet,
   wherein the heat transfer media comprises a first heat transfer medium stacked with a second heat transfer medium.

2. The plasma display apparatus of claim 1, wherein one of the heat transfer media is a metal plate selected from the group consisting of aluminum plate, copper plate, silver plate, and nickel plate.

3. The plasma display apparatus of claim 1, wherein one of the heat transfer media is easily deformable by an external force.

4. The plasma display apparatus of claim 1, wherein one of the heat transfer media is a thermal conductive container filled with a liquid heat dissipation material.

5. The plasma display apparatus of claim 4, wherein the liquid heat dissipation material is a thermal grease.

6. The plasma display apparatus of claim 1, wherein one of the heat transfer media is a thermal conductive container filled with a thermal conductive powder.

7. The plasma display apparatus of claim 6, wherein the thermal conductive powder is a powder selected from the group consisting of an aluminum powder, a graphite powder, a copper powder, a silver powder, and a nickel powder.

8. The plasma display apparatus of claim 1, wherein one of the heat transfer media is a matrix resin containing a heat transfer filler.

9. The plasma display apparatus of claim 8, wherein the heat transfer filler is a metal powder selected from the group consisting of an aluminum powder, a graphite powder, a copper powder, a silver powder, and a nickel powder.

10. The plasma display apparatus of claim 1, wherein one of the heat transfer media is a carbon fiber fabric.

11. The plasma display apparatus of claim 1, wherein the heat dissipation means is a heat pipe.

12. The plasma display apparatus of claim 1, wherein the chassis base includes at least a bent part, the circuit devices are mounted on the bent part.

13. The plasma display apparatus of claim 1, wherein the cabinet comprises a front cover and a back cover.

14. The plasma display apparatus of claim 13, wherein the circuit device contacting the heat dissipation means is mounted in the rear of the chassis base, and the heat dissipation means is interposed between the circuit device and the back cover.

15. The plasma display apparatus of claim 13, wherein the circuit device contacting the heat dissipation means is mounted in the front of the chassis base, and the heat dissipation means is interposed between the circuit device and the front cover.

16. The plasma display apparatus of claim 1, wherein at least one air hole is formed in the cabinet to allow outside air to flow into the plasma display apparatus.

17. The plasma display apparatus of claim 16, wherein the heat dissipation means includes cooling fins.

18. A plasma display apparatus, comprising:
    a plasma display panel on which an image is displayed;
    a chassis base supporting the plasma display panel;
    a plurality of circuit devices operating the plasma display panel;
    a heat dissipation means in contact with at least one circuit device; and
    a cabinet housing the plasma display panel, the chassis base, the plurality of circuit devices, and the heat dissipation means, in which at least a protrusion hole is formed through which at least a portion of the heat dissipation means is protruded to the outside of the plasma display apparatus.

19. The plasma display apparatus of claim 18, wherein the heat dissipation means includes at least two different heat transfer media that are stacked.

20. The plasma display apparatus of claim 19, wherein one of the heat transfer media is a metal plate selected from the group consisting of aluminum plate, copper plate, silver plate, and nickel plate.

21. The plasma display apparatus of claim 19, wherein one of the heat transfer media is easily deformable by an external force.

22. The plasma display apparatus of claim 19, wherein one of the heat transfer media is a thermal conductive container filled with a liquid heat dissipation material.

23. The plasma display apparatus of claim 22, wherein the liquid heat dissipation material is a thermal grease.

24. The plasma display apparatus of claim 19, wherein one of the heat transfer media is a thermal conductive container filled with a thermal conductive powder.

25. The plasma display apparatus of claim 24, wherein the thermal conductive powder is a powder selected from the group consisting of an aluminum powder, a graphite powder, a copper powder, a silver powder, and a nickel powder.

26. The plasma display apparatus of claim 19, wherein one of the heat transfer media is a matrix resin containing a heat transfer filler.

27. The plasma display apparatus of claim 26, wherein the heat transfer filler is a metal powder selected from the group consisting of an aluminum powder, a graphite powder, a copper powder, a silver powder, and a nickel powder.

28. The plasma display apparatus of claim 19, wherein one of the heat transfer media is a carbon fiber fabric.

29. The plasma display apparatus of claim 18, wherein the heat dissipation means is a heat pipe.

30. The plasma display apparatus of claim 18, wherein the heat dissipation means includes cooling fins.

* * * * *